US005696369A

United States Patent [19]
Watanabe

[11] Patent Number: 5,696,369
[45] Date of Patent: Dec. 9, 1997

[54] INFORMATION RECORDING AND/OR REPRODUCING APPARATUS PROVIDED WITH MECHANISM FOR CARRYING MEDIUM

[75] Inventor: Tetsuo Watanabe, Machida, Japan

[73] Assignee: Canon Kabushiki Kaisha, Tokyo, Japan

[21] Appl. No.: 780,782

[22] Filed: Jan. 9, 1997

Related U.S. Application Data

[63] Continuation of Ser. No. 429,848, Apr. 27, 1995, abandoned.

[30] Foreign Application Priority Data

Apr. 30, 1994 [JP] Japan .................................. 6-113793

[51] Int. Cl.⁶ .................................................. G05K 7/10
[52] U.S. Cl. ..................... 235/454; 235/486; 235/484; 235/485; 235/483
[58] Field of Search .................................. 235/454, 439, 235/444, 475, 483, 485, 486, 495, 484

[56] References Cited

U.S. PATENT DOCUMENTS

| 4,931,622 | 6/1990 | Ohtsuki et al. ............... 235/485 X |
| 5,008,552 | 4/1991 | Kuramochi et al. ............ 235/484 X |
| 5,117,415 | 5/1992 | Ohta et al. .................... 235/486 X |
| 5,250,794 | 10/1993 | Ito et al. ....................... 235/486 X |
| 5,262,629 | 11/1993 | Hayashi et al. ............... 235/454 X |
| 5,332,890 | 7/1994 | Kitahara ....................... 235/454 X |
| 5,332,891 | 7/1994 | Togana ......................... 235/486 X |
| 5,371,723 | 12/1994 | Sakurada ...................... 235/454 X |

FOREIGN PATENT DOCUMENTS 636077 2/1994 Japan .

*Primary Examiner*—Donald T. Hajec
*Assistant Examiner*—Michael G. Lee
*Attorney, Agent, or Firm*—Fitzpatrick, Cella, Harper & Scinto

[57] ABSTRACT

An optical information recording and/or reproducing apparatus for recording and/or reproducing information with a light beam in or from a card information recording medium provided with a plurality of linear tracks, includes a card holder on which the medium is mounted, an optical head for projecting the light beam toward the medium, and a card holder moving mechanism for moving the card holder in a transverse direction to the tracks. An optical head moving mechanism translates the optical head in a direction along the tracks, and a holding mechanism provided below the card holder, holds the medium on the card holder.

14 Claims, 4 Drawing Sheets

INFORMATION RECORDING AND/OR REPRODUCING APPARATUS PROVIDED WITH MECHANISM FOR CARRYING MEDIUM

This application is a continuation of application Ser. No. 08/429,848, filed Apr. 27, 1995, now abandoned.

BACKGROUND OF THE INVENTION

1. Field of the Invention

The present invention relates to an information recording and/or reproducing apparatus for recording and/or reproducing information in or from a recording medium.

2. Related Background Art

Conventional information recording and/or reproducing apparatus are classified under a magnetic method and an optical method, among which the optical method is drawing attention in recent years. As apparatus for recording and/or reproducing information with a light beam there are apparatus using a CD, a recording medium of a disk shape being rotated, a laser disk, an optical card, a recording medium of a card shape being translated, or an optical tape. These apparatus are properly used depending upon the purpose, among which the optical card is especially drawing attention because it is excellent in storage and portability.

An apparatus using the optical card as an information recording medium is so arranged that tracks are formed at intervals of some μm in the optical card and a light beam forms a spot in diameter of some μm between tracks, thereby performing recording and/or reproduction of information. The apparatus is arranged to record and/or reproduce information by driving a card holder on which the optical card is mounted and an optical head in directions perpendicular to each other and projecting the light beam onto the optical card while making it follow a track in parallel therewith.

For such information recording and/or reproducing apparatus, there is a known method, as shown in a first conventional example of FIG. 1, in which the card holder 1 is linearly translated on guide shafts 2, 3 in X directions along information tracks in the optical card C and an optical head 4 is moved in Y directions perpendicular to the information tracks.

FIG. 2 shows a structural drawing of a second conventional example of the information recording and/or reproducing apparatus, in which the card holder 13 holding the optical card C is supported so as to be movable through bearings or slide bearings not shown along the guide shafts 11, 12 provided in parallel in the X direction. The card holder 13 is a little longer than the optical card C in the X direction and is linearly translated by a drive system such as a voice coil motor.

An urging member 15 to which rollers 14 are attached is provided on a side parallel to the guide shafts 11, 12 in the card holder 13, and is arranged to be capable of urging the optical card C against a reference face formed on the other side of the card holder 13. Above the reference face a press member 17 journaled on a shaft 16 is provided as urged by springs 18, 19. Above the urging member 15 another press member 21 journaled on a shaft 20 is provided as urged by springs not shown. A wedge projection 17a or 21a is formed at a -X directional end of the press member 17 or 21, respectively.

A lock member 23 is provided at a -X directional end of guide shaft 12 so as to be pivotable about a shaft 22, and one end 23a of this lock member 23 is shaped into a hook capable of engaging with the card holder 13 while the other end of the lock member 23 is connected through a spring 24 to a solenoid or the like. Further, a shaft 25 is provided in correspondence to the wedge projections 17a, 21a in the -X direction in the card holder 13.

Upon discharging the optical card C, the card holder 13 is first moved to the -X directional end being an insertion/discharge position and thereafter the lock mechanism is actuated to rotate the lock member 23, so that the tip of the lock member 23 comes to engage with the card holder 13, thus locking the card holder 13. Since this moves the wedge projections 17a, 21a of the press members 17, 21 with the lower ends thereof being in contact with the shaft 25, the press members 17, 21 are lifted up so as to release the pressure on the optical card C. In this case, a drive source of the mount table 13 needs to have a drive force capable of releasing the press state. From this state, the optical card C is discharged in the X direction by a card carrying system not shown.

When the optical card is inserted in the apparatus, the card holder 13 is awaiting insertion still in a discharge end state. The optical card C is inserted in the -X direction and moves with one longer side of the optical card C sliding on the urging member 15 and the other side sliding on the reference face of the card holder 13, whereby the optical card C is regularly set in the Y direction.

After completion of insertion of the optical card C, the one end 23a of the lock member 23 is released and the card holder 13 starts moving, whereby the wedge projections 17a, 21a then leave the shaft 25. Then the press members 17, 21 are urged onto the two longer sides of the optical card C through the action of the corresponding springs, thereby holding the optical card C. Further, the press members 17, 21 function to correct a warp of the optical card C, thereby helping the optical recording and/or reproducing operation.

As described above, the insertion/discharge operation of the optical card C involves only slide resistance between the reference face of the card holder 13 and the optical card C and slide resistance between the rollers 14 and the optical card C, but excludes slide resistance between the optical card C and the press members 17, 21, which allows the drive force of the card carrying system to be set small.

Recently, a split type optical head was developed as in a third conventional example shown in FIG. 3. The optical head 31 is split into a stationary unit 32a and a movable unit 32b, in which the weight of the movable unit 32b is decreased. With this progress of the technology to achieve the high-speed operation, there is developed a method in which the optical head 31 is linearly translated along the information tracks T in the optical card C and the card holder 32 is moved in the transverse direction to the tracks.

Since the third conventional example is so arranged that the optical head smaller than the card holder is translated, a stroke space for translation can be made smaller than those in the structures shown in the first and second conventional examples translating the card holder, thus presenting an advantage of capability of constructing the apparatus in a compact scale.

SUMMARY OF THE INVENTION

An object of the present invention is to provide an information recording and/or reproducing apparatus enabling to realize a further scale reduction.

The above object can be achieved by an optical information recording and/or reproducing apparatus for recording and/or reproducing information with a light beam in or from a card information recording medium provided with a plurality of linear tracks, comprising:

a card holder on which the medium is mounted;

an optical head for projecting the light beam toward the medium;

card holder moving means for moving the card holder in a transverse direction to the tracks;

optical head moving means for translating the optical head in a direction along the tracks; and holding means provided below the card holder, for holding the medium on the card holder.

The invention will be described in further detail with an embodiment to follow.

DETAILED DESCRIPTION OF THE PREFERRED EMBODIMENT

The present invention will be described in detail based on the embodiment shown in FIG. 4 to FIG. 9B.

Figure 1:
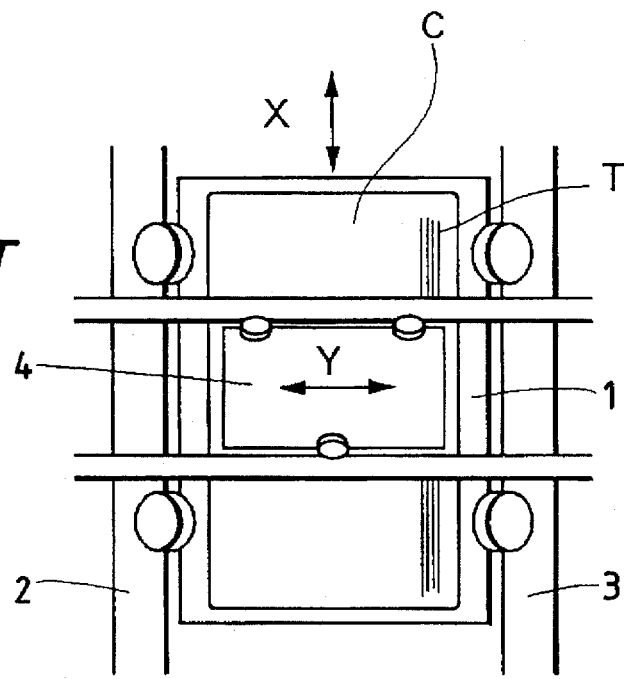
FIG. 1 is a plan view to show the first conventional example.
Figure 2:
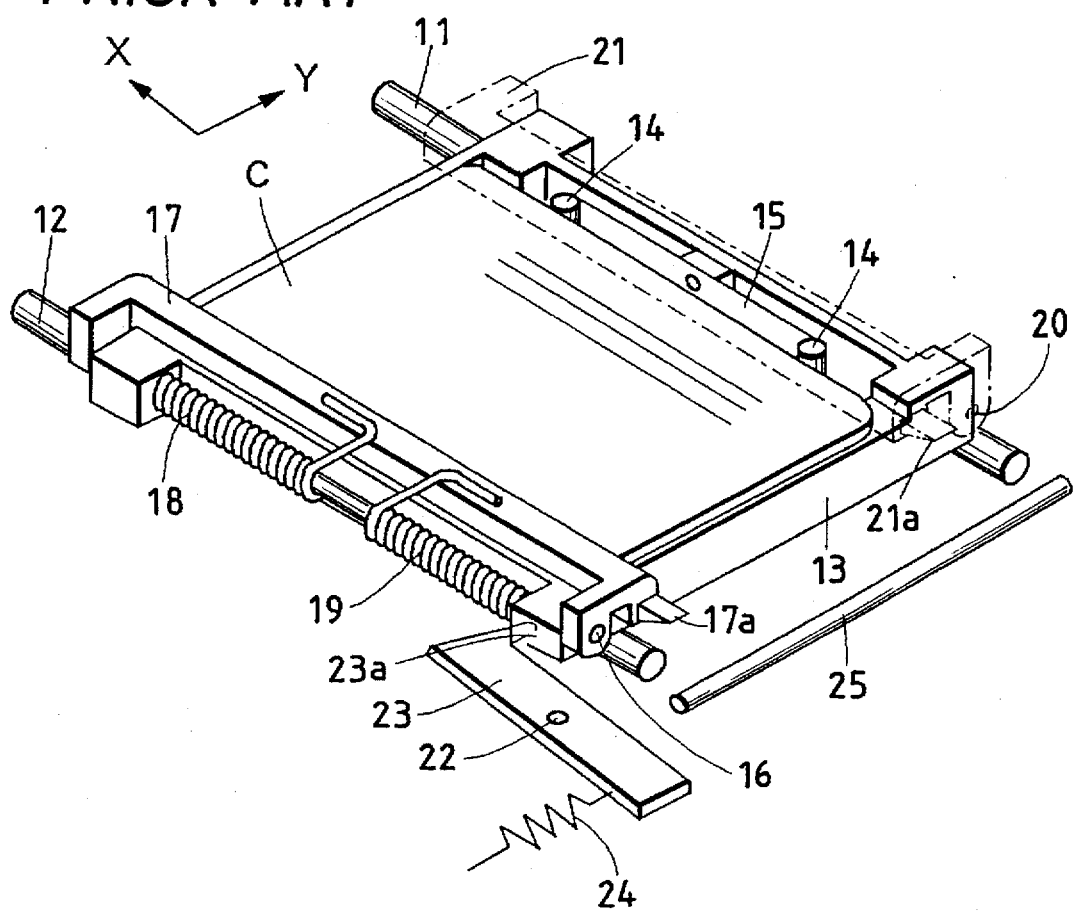
FIG. 2 is a perspective view to show the second conventional example.
Figure 3:
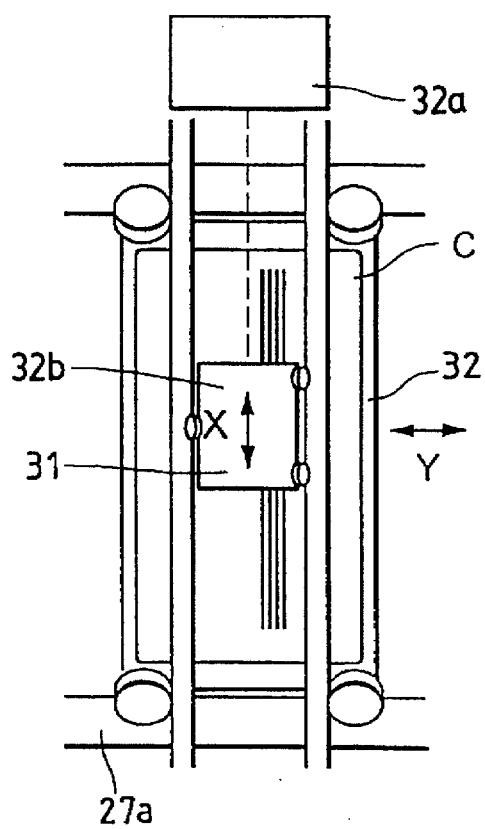
FIG. 3 is a plan view to show the third conventional example.
Figure 5:
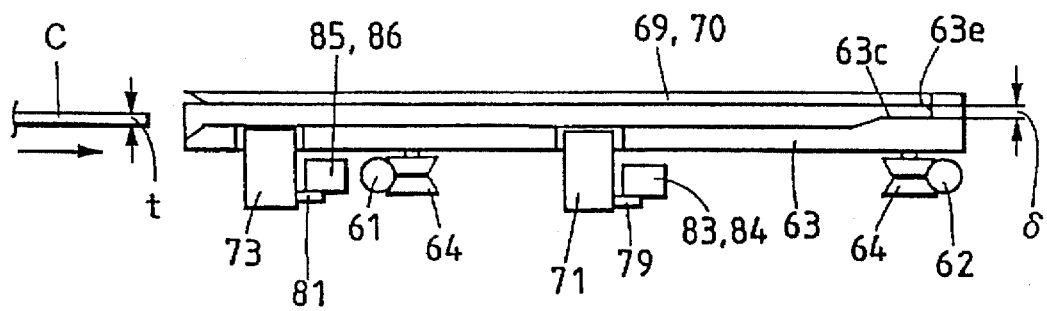
FIG. 5 is a cross section taken along G—G line and G'—G' line in FIG. 4.
Figure 6:
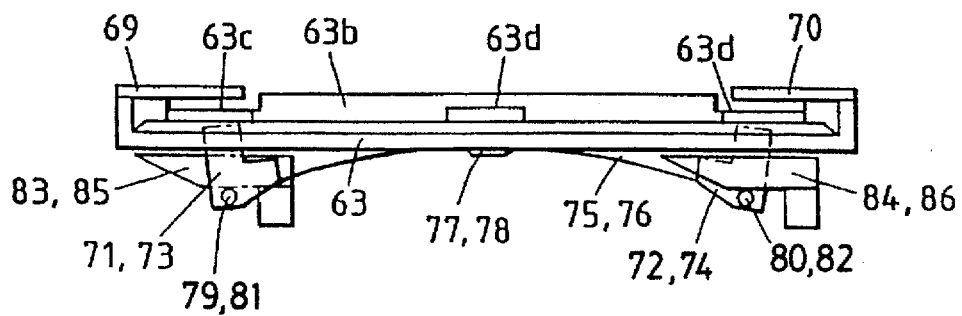
FIG. 6 is a cross section taken along H—H line in FIG. 4.
Figure 4:
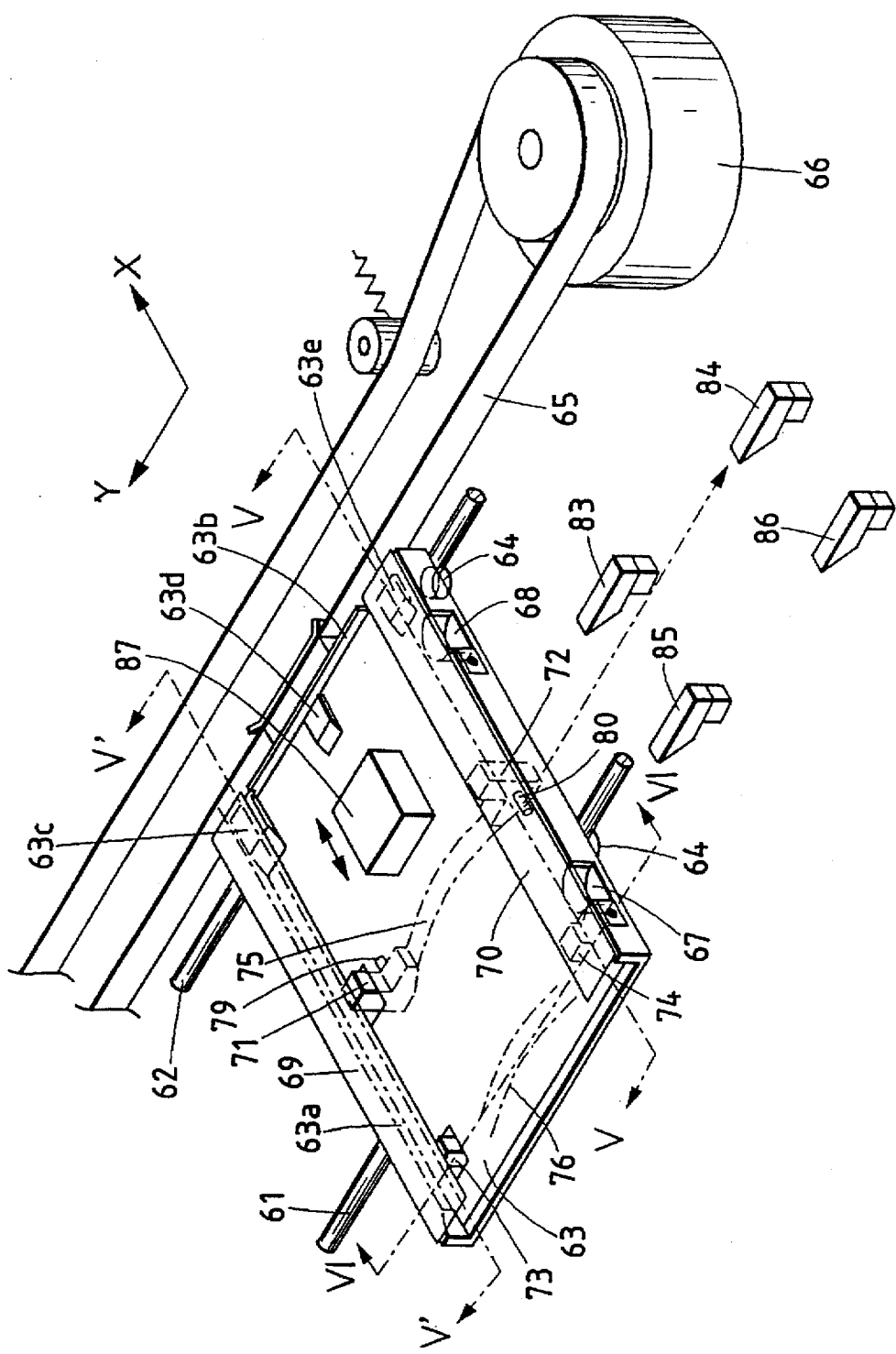
FIG. 4 is a perspective view to show an embodiment of the present invention.

FIG. 4 is a perspective view of a first embodiment, FIG. 5 is a cross section taken along V—V line and V'—V' line in FIG. 4, and FIG. 6 is a cross section taken along V1—V1 line. The card holder 63 on which the optical card C with a plurality of parallel information tracks is mounted is supported through bearings 64 on two parallel guide shafts 61, 62 fixed in parallel to the apparatus, so as to be movable in the Y direction (a direction perpendicular to the information tracks on the optical card C mounted on the card holder 63). This card holder 63 is connected through a steel belt 65 to an ultrasonic motor 66, and a tension is applied to the steel belt 65 so as to prevent sliding between the steel belt 65 and a pulley of the ultrasonic motor 66. Here, the guide shafts 61, 62 are set at respective positions below the lower surface of the card holder.

Press reference faces 63a, 63b for regularly setting the optical card C are formed on a long side in the Y direction and a short side in the X direction, respectively, of the card holder 63, and three projecting portions 63c, 63d, 63e are formed in the bottom surface of the card holder 63 on the side of the press reference face 63b. Further, card urging members 67, 68 each consisting of a plate spring or the like for urging the optical card C are provided on another long side opposed to the press reference face 63a. Provided above the press reference face 63a and the card urging members 67, 68 are card holding plates 69, 70, respectively, forming grooves into which the both edges of the optical card C along the information tracks are introduced. In this arrangement, a separation δ between lower surfaces of the card holding plates 69, 70 and the highest point of the projecting portions 63c, 63e opposed thereto is set a little larger than a thickness t of the optical card C, as shown in FIG. 5.

Four press members 71 to 74 are provided on the lower surface of the card holder 63 as shown in FIG. 6, and these press members 71 to 74 are arranged to penetrate holes formed in the bottom surface of the card holder 63. Also, the press members 71, 72 and the press members 73, 74 are connected by plate springs 75, 76 in parallel with the guide shafts 61, 62, respectively, and these plate springs 75, 76 are fixed by respective screws 77, 78 to the card holder 63 at the central portion thereof.

Pins 79 to 82 are attached to side surfaces in the ±X directions, in the press members 71 to 74, and the pins 79, 80 and the pins 81, 82 are attached to project in the directions opposite to each other. Also, at the card insertion/discharge position, hooks 83 to 86 each having a slant face in the moving direction of the card holder 63 are provided corresponding to the pins 79 to 82. On the other hand, a moving optical head 87 is set above the card holder 63 and is arranged so that it is linearly translated in the X directions by a drive source such as a voice coil motor and so that recording and/or reproduction of information is carried out with a light beam emitted from the optical head 87.

For insertion of the optical card C, when the card holder 63 is moved to the card insertion/discharge position by the ultrasonic motor 66, the pins 79 to 82 are guided downward along the slant faces of the hooks 83 to 86, whereby the urging forces of the press members 71 to 74 are released as shown in FIG. 5 and FIG. 6. In this state, the optical card C is inserted by a card carrying system not shown and then is regularly set while being urged in the Y direction by the card urging members 67, 68. When the card holder 63 is further moved in the Y direction, the downward guide of the pins 79 to 82 is released, so that the press members 71 to 74 come to hold the optical card C by urging it from the bottom.

Figure 7A:
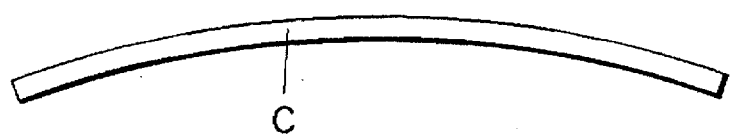
FIGS. 7A and 7B are explanatory drawings to show a case where the optical card is warped in the longitudinal direction thereof.
Figure 7B:
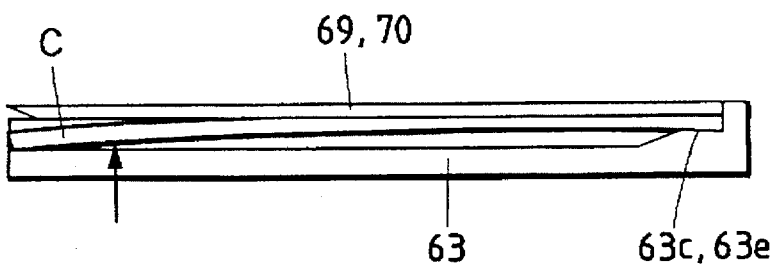
Figure 8A:
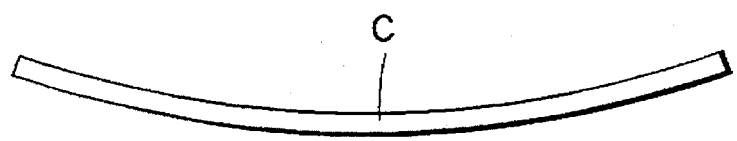
FIGS. 8A and 8B are explanatory drawings to show another case where the optical card is warped in the longitudinal direction thereof.
Figure 8B:
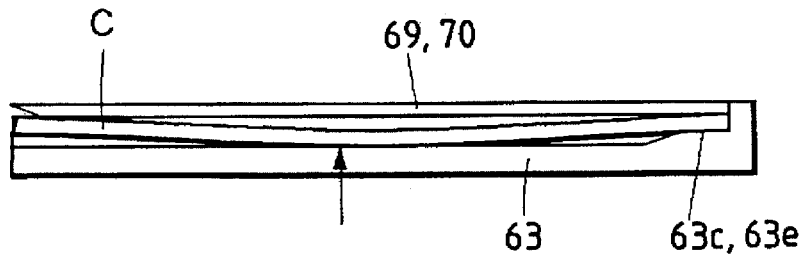

The warp of card in the longitudinal direction thereof can be roughly classified into cases where it is convex on the card recording surface side of the top surface as shown in FIGS. 7A and 7B and cases where it is concave on the card recording surface side as shown in FIGS. 8A and 8B. In order to eliminate this warp, it is necessary that the optical card C be urged throughout the entire region in the longitudinal direction thereof by thick press members with high stiffness. There is, however, a problem that because they are perpendicular to the guide shafts 61, 62 as a support system, the card holder 63 becomes larger in the thickness direction when constructed so as not to interfere with the support system.

Thus, when one end of the card C is inserted and held in a gap between the projecting portions 63c, 63e and the card holding plates 69, 70, the warp of the optical card C is corrected by urging the other end or the central portion of the optical card C toward the holding plates 69, 70, as shown in FIG. 7B or FIG. 8B. Since this press is effected by an elastic force of the plate springs 75, 76 connected to the press members 71 to 74, the holding mechanism can be constructed so as not to interface with the support system, in a substantially same space as the height of the support system.

Figure 9A:
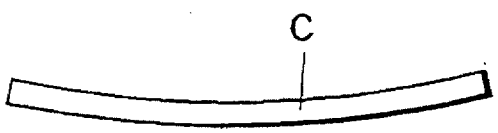
FIGS. 9A and 9B are explanatory drawings to show a case where the optical card is warped in the transverse direction thereof.
Figure 9B:
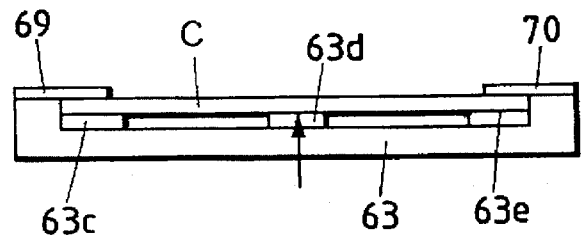

On the other hand, where a concave warp is present in the transverse direction of the optical card C, as shown in FIGS. 9A and 9B, a correcting effect of warp can be achieved by a projecting portion 63d provided in the central portion of the card holder 63, as shown in FIG. 9B.

In this holding mechanism, a correcting force of warp of the optical card C depends upon the elastic force of the plate springs 75, 76. The holding and releasing of card requires a force for guiding the pins 79 to 82 along the slant faces while overcoming the elastic force. It can be realized without increasing the scale of apparatus by using the high-torque ultrasonic motor 66.

As described above, because the present invention employs the mechanism for holding the optical card C below the card holder, the structure of the top surface of the card holder can be simplified and flattened as compared with the cases where the holding mechanism is provided above the card holder. This excludes the problem of interference upon relative movement between the moving optical head and the upper part of the card holder, so that the moving optical head can be set more proximately to the optical card. Accordingly, the invention permits use of a moving optical head employing an objective lens with short focal length expected to give a higher resolution and permits the apparatus to be constructed in a thinner and more compact configuration to the degree that the moving optical head becomes closer to the optical card. When the holding mechanism is set below the card holder, the holding mechanism can be located in an unused space for example between the guide shafts, which was present also in the conventional apparatus. Thus, this structure is free of increases in thickness and scale of apparatus.

What is claimed is:

1. An optical information recording and/or reproducing apparatus for recording and/or reproducing information with a light beam in or from a card information recording medium provided with a plurality of linear tracks, comprising:

a card holder on which the medium is mounted;

an optical head for projecting a light beam toward the medium;

card holder moving means for moving said card holder in a direction transverse to the tracks;

optical head moving means for translating said optical head in a direction along the tracks; and holding means, provided below said card holder, for holding the medium on said card holder, said holding means including a reference member provided on said card holder for defining a position of the medium in a direction perpendicular to a mount surface of said card holder, with an opening provided in said mount surface, a plurality of projecting portions projecting from the opening, and urging means for urging said projecting portions in a projecting direction, wherein the medium is held on said card holder by being pinched between said reference member and said projecting portions.

2. The apparatus according to claim 1, further comprising hold releasing means for releasing holding of the medium by said holding means when said card holder moves to an insertion and discharge position of the medium.

3. The apparatus according to claim 2, wherein said hold releasing means comprises a contact member fixed to the apparatus, said contact member coming into contact with a part of each of said projecting portions when said card holder moves to the insertion and discharge position of the medium, and wherein said projecting portions are displaced by contact with said contact member in a direction to release holding of the medium.

4. The apparatus according to claim 3, wherein said contact member is a plurality of members corresponding to said respective projecting portions.

5. The apparatus according to claim 1, wherein said urging means is a plate spring.

6. The apparatus according to claim 1, wherein said reference member comprises a portion of grooves provided in said card holder and arranged so that two edges of the medium along the tracks can be set therein.

7. The apparatus according to claim 1, wherein a plurality of openings are provided so as to respectively correspond to each of said plurality of projecting portions.

8. An optical information recording and/or reproducing apparatus for recording and/or reproducing information with a light beam in or from a card information recording medium provided with a plurality of linear tracks, comprising:

a card holder on which the medium is mounted;

an optical head for projecting a light beam toward the medium;

moving means for effecting relative movement between said card holder and said optical head; and holding means, provided below said card holder, for holding the medium on said card holder, said holding means including a reference member provided on said card holder for defining a position of the medium in a direction perpendicular to a mount surface of said card holder, with an opening provided in said mount surface, a plurality of projecting portions projecting from the opening, and urging means for urging said projecting portions in a projecting direction, wherein the medium is held on said card holder by being pinched between said reference member and said projecting portions.

9. The apparatus according to claim 8, further comprising hold releasing means for releasing holding of the medium by said holding means when said card holder moves to an insertion and discharge position of the medium.

10. The apparatus according to claim 9, wherein said hold releasing means comprises a contact member fixed to the apparatus, said contact member coming into contact with a part of each of said projecting portions when said card holder moves to the insertion and discharge position of the medium, and wherein said projection portions are displaced by contact with said contact member in a direction to release holding of the medium.

11. The apparatus according to claim 10, wherein said contact member is a plurality of members corresponding to said projecting portions.

12. The apparatus according to claim 8, wherein said urging means is a plate spring.

13. The apparatus according to claim 8, wherein said reference member comprises a portion of grooves provided in said card holder and arranged so that two edges of the medium along the tracks can be set therein.

14. The apparatus according to claim 8, wherein a plurality of openings are provided so as to respectively correspond to each of said plurality of projecting portions.

* * * * *